United States Patent
Terada et al.

(10) Patent No.: US 11,746,880 B2
(45) Date of Patent: Sep. 5, 2023

(54) MOTOR REDUCER

(71) Applicant: KANZAKI KOKYUKOKI MFG. CO., LTD., Amagasaki (JP)

(72) Inventors: Mai Terada, Amagasaki (JP); Koji Kiyooka, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 17/531,943

(22) Filed: Nov. 22, 2021

(65) Prior Publication Data

US 2022/0186826 A1 Jun. 16, 2022

(30) Foreign Application Priority Data

Dec. 15, 2020 (JP) .................................. 2020-207890

(51) Int. Cl.
| F16H 57/02 | (2012.01) |
| F16H 1/28 | (2006.01) |
| H02K 7/10 | (2006.01) |
| F16H 57/031 | (2012.01) |
| F16H 1/32 | (2006.01) |
| H02K 7/00 | (2006.01) |
| H02K 7/116 | (2006.01) |
| F16H 57/029 | (2012.01) |

(52) U.S. Cl.
CPC ............ *F16H 57/031* (2013.01); *F16H 1/32* (2013.01); *F16H 57/029* (2013.01); *H02K 7/003* (2013.01); *H02K 7/116* (2013.01); *F16H 2057/02034* (2013.01)

(58) Field of Classification Search
CPC ............ F16H 1/32; F16H 2057/02034; F16H 57/029; F16H 57/031; H02K 7/003; H02K 7/116
See application file for complete search history.

(56) References Cited

U.S. PATENT DOCUMENTS 7,182,709 B2 * 2/2007 Christ .................... H02K 7/116
475/331
10,455,759 B2 10/2019 Gervais et al.

FOREIGN PATENT DOCUMENTS

| CN | 102762883 A | * | 10/2012 | ............. F16D 65/18 |
| CN | 205841635 U | | 12/2016 | |
| CN | 207945251 U | | 10/2018 | |
| DE | 102013012916 A1 | | 3/2014 | |
| EP | 2901046 B1 | | 2/2017 | |
| JP | H11301497 A | * | 11/1999 | |
| JP | 2010014239 A | * | 1/2010 | |
| JP | 2012097903 A | | 5/2012 | |

(Continued)

OTHER PUBLICATIONS

Machine translation of JP 2016-70322 A obtained on Oct. 4, 2022.*

(Continued)

*Primary Examiner* — Adam D Rogers
(74) *Attorney, Agent, or Firm* — CANTOR COLBURN LLP

(57) ABSTRACT

A motor reducer of the at least an embodiment of the present invention includes a reduction gear train that decelerates rotation input from a motor, and a reducer casing that accommodates the reduction gear train. An input cover that seals a motor-side end face of the reducer casing is provided, and the input cover is provided separately from the motor casing.

7 Claims, 7 Drawing Sheets

(56) References Cited

FOREIGN PATENT DOCUMENTS

| | | | | |
|---|---|---|---|---|
| JP | 2016070322 A | | 5/2016 | |
| JP | 2021179234 A | * | 11/2021 | |
| WO | WO-2012077295 A1 | * | 6/2012 | .............. E02F 9/123 |

OTHER PUBLICATIONS

Machine translation of CN 207945251 U obtained on Feb. 1, 2023.*
EPO Extended European Search Report for corresponding EP Application No. 21210083.8; dated May 13, 2022.

* cited by examiner

MOTOR REDUCER

CROSS REFERENCE OF RELATED APPLICATIONS

The present invention claims priority under 35 U.S.C. § 119 to Japanese Application No. 2020-207890 filed Dec. 15, 2020, the entire content of which is incorporated herein by reference.

BACKGROUND OF THE INVENTION

Field of the Invention

At least one embodiment according to the present invention relates to a motor reducer, and more particularly to a motor reducer that is disposed between an electric motor and a load device and reduces a rotation speed of the electric motor.

Description of Related Art

In the related art, as a load device driven by an electric motor, for example, there is a weighing machine attached to a seeder and used for weighing seeds and fertilizers. The weighing machine is configured to input rotation of the electric motor to a weighing rotor, and rotatably drive the weighing rotor, thereby weighing seeds and fertilizer. In such a weighing machine, it is common to provide a motor reducer in order to adjust the rotation of the electric motor to a rotation speed suitable for driving the weighing rotor. A technique for providing a motor reducer between an electric motor and a load device is disclosed in, for example, the following Patent Literature 1; U.S. Pat. No. 10,455,759 B2.

As disclosed in Patent Literature 1, a conventional weighing machine includes a weighing roller that is rotationally driven via a motor reducer. In the conventional weighing machine, the electric motor and the motor reducer are coupled in series and become long in the axial direction, so that the electric motor and the motor reducer greatly protrude from the coupling face of the weighing machine.

In the related art, when a motor reducer is attached to an electric motor, a motor-side end face of the motor reducer is sealed using a motor cover. However, in such a structure, when the electric motor is separated from the motor reducer, a reduction gear train in the motor reducer may fall off from the motor-side end face. In addition, a seeder is often attached to a work vehicle or the like and used, but when the protrusion dimension is large, stress acts on the connection portion between the motor reducer and the load device (weighing machine) due to vibration during traveling, and thus the rigidity of the coupling face is required to be increased. In addition, it is necessary to take care not to leak the lubricant with which the motor reducer is filled to the outside.

SUMMARY OF THE INVENTION

At least an embodiment of the present invention has been made in view of such a current issue, and makes it possible to prevent the reduction gear train from being dislocated and falling off even in a state where the motor reducer is separated from the electric motor.

In addition, by reducing the number of bearings and making the planetary gear and the motor shaft coaxial, it is possible to shorten the axial length of the entire gear box, reduce the weight, and manufacture the gear box at low cost.

Furthermore, an object is to provide a motor reducer capable of suppressing leakage of lubricating oil in the motor reducer.

The problem to be solved by the present invention is as described above, and means for solving the problem will be described below.

That is, in a motor reducer according to the at least an embodiment of the present invention that decelerates rotation input from an electric motor stored in a motor casing to output the rotation to a load device, the motor reducer includes a reduction gear train that decelerates rotation input from the electric motor, a reducer casing that accommodates the reduction gear train, and an input cover that seals a motor-side end face of the reducer casing, the input cover being provided separately from the motor casing.

In the motor reducer according to the present invention, the input cover may be fixed to one end of a reducer casing constituting a reduction gear train.

Alternatively, in the motor reducer according to the present invention, a motor output gear that rotates integrally with a motor shaft of the electric motor may be integrally formed in a cylindrical body locked to an outer periphery of the motor shaft in a relatively non-rotatable manner, the input cover may have a penetration hole into which the cylindrical body penetrates, and a labyrinth groove may be provided between an inner peripheral face of the penetration hole and an outer peripheral face of the cylindrical body.

Alternatively, in the motor reducer according to the present invention, a motor output gear having a tooth tip having an outer diameter equal to or smaller than a diameter of a motor shaft at one end of the motor shaft of the electric motor may be provided, the input cover may have a penetration hole into which the motor shaft penetrates, and a labyrinth groove may be provided between an inner peripheral face of the penetration hole and an outer peripheral face of the motor shaft.

Alternatively, the motor reducer according to the at least an embodiment of the present invention may include an output cover that is to be coupled to the load device, and the output cover rotatably may support an output shaft that outputs rotation from the reduction gear train and seal another end of the reducer casing.

Alternatively, in the motor reducer according to the present invention, the output cover may be fixed to the motor casing by a fastening member.

Alternatively, in the motor reducer according to the present invention, the reduction gear train may be of a planetary gear type, and an outer peripheral portion of a planetary carrier provided at one end of the output shaft may be rotatably slidably brought into contact with an inner peripheral face of the output cover.

As effects of the present invention, the following effects are obtained.

According to the motor reducer of the present invention, even when the motor reducer is separated from the electric motor, the input cover makes it possible to prevent the reduction gear train from collapsing in its arrangement and falling off. As a result, the motor reducer can be unitized, and maintenance of the electric motor is facilitated. In addition, since leakage of lubricating oil in the motor reducer can be prevented, for example, molybdenum grease or the like can be used, and fretting can be suppressed.

The foregoing or other features and effects will be apparent in the following detailed description of the invention with reference to the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

First Embodiment

Figure 1:
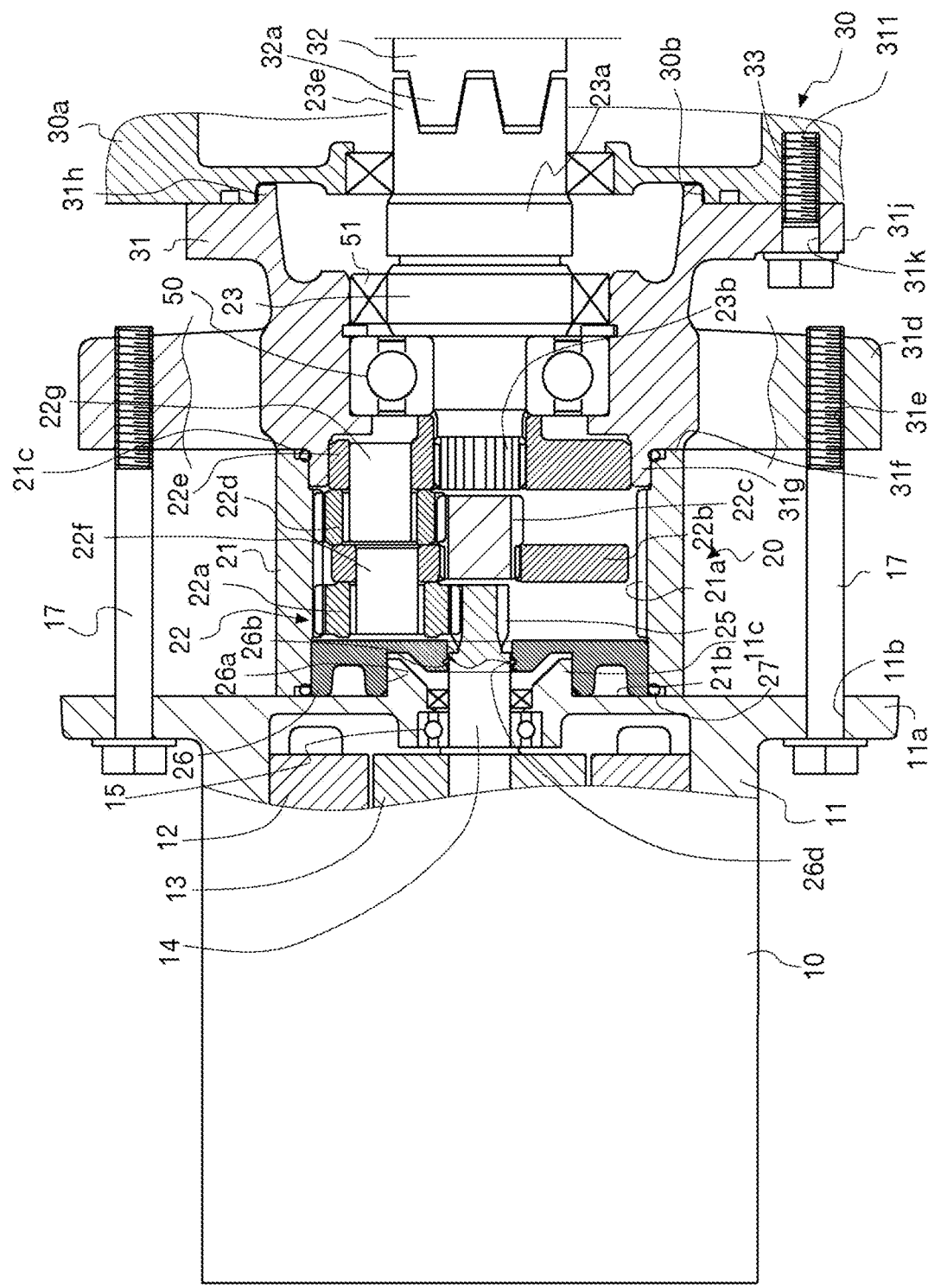
FIG. 1 is a cross-sectional view illustrating a motor reducer.

As illustrated in FIG. 1, a motor reducer 20 according to the first embodiment of the present invention is a device that decelerates rotation input from an electric motor 10 stored in a motor casing 11 to output the rotation to a load device. The motor reducer 20 is coupled to an input side of a weighing machine 30 which is a load device.

[Motor]

The electric motor 10 is a drive source that drives the load device via the motor reducer 20, and includes the motor casing 11, a stator 12, a rotor 13, and a motor shaft 14. The rotation speed and the rotation amount of the electric motor 10 are controlled by a controller (not illustrated) that controls the operation of the weighing machine 30.

The electric motor 10 is configured such that the rotor 13 is disposed inside the stator 12 accommodated by the motor casing 11, the rotor 13 is rotated as the coil of the stator 12 is energized, and the motor shaft 14 provided coaxially with the rotor 13 is rotationally driven. The motor shaft 14 is rotatably supported by a bearing 15 interposed between the motor shaft and the motor casing 11. A motor output gear 25 that engages with the reduction gear train 22 is provided at an end of a portion, of the motor shaft 14, protruding outward from the motor casing 11. In the present embodiment, the motor output gear 25 is directly formed (gear cutting) at the tip of the motor shaft 14. With such a configuration, as compared with the case where the motor output gear 25 is configured separately, the axial length of the overlapping portion of the inner diameter of a first pinion gear 22a meshing with the motor output gear can be shortened, the number of parts is reduced, and the assembly process can be shortened. In addition, the reduction ratio of the motor reducer 20 can be set large by minimizing the input gear diameter. The motor output gear 25 has a tooth tip having substantially a diameter equal to or smaller than the diameter of the distal end of the motor shaft 14, and as described later, when the motor is mounted, the motor output gear 25 can be inserted into the motor reducer 20 through a penetration hole 26b of an input cover 26.

The motor casing 11 has a plurality of extending portions 11a for supporting penetration of a fastening member 17 such as a bolt. Each of the extending portions 11a is a member protruding from an end face toward the motor reducer 20 in the radially outer peripheral direction, and has a penetration hole 11b into which the fastening member 17 penetrates.

[Motor Reducer]

The motor reducer 20 includes a reducer casing 21, a reduction gear train 22, an output shaft 23, the input cover 26, and an output cover 31. The motor output gear 25 is meshed with the reduction gear train 22, and the rotation of the electric motor 10 is input from the motor output gear 25 to the reduction gear train 22, to output the decelerated rotation in the reduction gear train 22 from the output shaft 23.

The reducer casing 21 is formed in a cylindrical shape, and includes an internal gear 21a directly machined (gear cutting) on the inner peripheral face of the intermediate portion in the axial direction. The input cover 26 is provided inside the motor-side end face 21b of the reducer casing 21. The input cover 26 is provided to encase components and grease inside the reducer casing 21. The input cover 26 is press-fitted to the inner peripheral face of an input-side end face 21b of the reducer casing 21 using a shrinkage fit, expansion fit, or the like, or is fixed so as not to fall off using a circlip (not illustrated) or the like. A gap between the input cover 26 and the reducer casing 21 is sealed by a seal 27. With such a configuration, the axial length of the reducer casing 21 can be shortened as compared with a configuration in which the input cover 26 is fastened to the reducer casing with a bolt.

The reduction gear train 22 is of a double-row (two rows in the embodiment) planetary gear type. Specifically, the internal gear 21a, the first pinion gear 22a, a first planetary carrier 22b, a sun gear 22c, a second pinion gear 22d, and a second planetary carrier 22e are provided.

The first pinion gear 22a is rotatably supported by a first carrier shaft 22f provided in the first planetary carrier 22b via a bearing, and meshes with the motor output gear 25 and the internal gear 21a. A sun gear 22c is provided on the rotation axis of the first planetary carrier 22b.

The second pinion gear 22d is rotatably supported by a second carrier shaft 22g provided in the second planetary carrier 22e via a bearing, and meshes with the sun gear 22c and the internal gear 21a. The output shaft 23 is provided on the rotation axis of the second planetary carrier 22e.

In the reduction gear train 22, when rotation is input from the motor output gear 25 to the first pinion gear 22a, the first pinion gear 22a rotates along the internal gear 21a, and at the same time, the first carrier shaft 22f revolves. The first planetary carrier 22b is rotated with the revolution of the first carrier shaft 22f to decelerate and rotate the sun gear 22c.

In the reduction gear train 22, when rotation is input from the sun gear 22c to the second pinion gear 22d, the second pinion gear 22d rotates along the internal gear 21a, and at the same time, the second carrier shaft 22g revolves. The second planetary carrier 22e is rotated with the revolution of the second carrier shaft 22g, and decelerates and rotates the output shaft 23.

The output shaft 23 is a rotary shaft that outputs rotation decelerated by the reduction gear train 22, and includes one end 23a and another end 23b in the axial direction. One end 23a of the output shaft 23 is located outside the reducer casing 21, and the other end 23b of the output shaft 23 is located inside the reducer casing 21. A joint portion 23e is formed at one end of the output shaft 23. The other end 23b of the output shaft has a spline and is locked to the center portion of the second planetary carrier 22e of the reduction gear train 22.

[Input Cover]

The annular positioning recess 26a used to align the motor shaft 14 and the output shaft 23 with each other at the time of engagement is provided on a face of the input cover 26 toward the electric motor 10. The positioning recess 26a of the input cover 26 is formed in parallel with the axial direction, and a positioning projection 11c used for alignment at the time of engagement is provided on a face of the motor casing 11 toward the motor reducer.

The outer peripheral face of the positioning projection 11c is parallel to the axial direction and is formed to have a diameter same as that of the inner peripheral face of the positioning recess 26a. As a result, when the electric motor 10 and the motor reducer 20 are engaged, the outer peripheral face of the positioning projection 11c and the inner peripheral face of the positioning recess 26a contact each other, whereby the alignment is performed. In addition, since the input cover 26 and the motor casing 11 are provided separately as described above, even when the electric motor 10 is replaced, the motor reducer 20 is sealed by the input cover 26, and thus, the assembled state of the reduction gear train 22 is maintained without each component jumping out.

A central portion of the input cover 26 has a penetration hole 26b into which the motor shaft 14 of the electric motor 10 penetrates. At least one groove 26d is provided on the inner peripheral face of the penetration hole 26b.

When the motor shaft 14 penetrates into the penetration hole 26b, a labyrinth structure is established by the outer peripheral face of the motor shaft 14 and the groove 26d. The labyrinth structure exhibits a sealing effect when the motor shaft 14 rotates, and it is possible to suppress or reduce leakage of lubricating oil such as grease toward the electric motor 10 through the penetration hole 26b.

[Weighing Machine]

The weighing machine 30 is an example of a load device, and is a device that is rotationally driven by the electric motor 10 and configured to be able to discharge an object to be measured such as seeds and fertilizer stored in the weighing machine 30 while weighing the object.

A joint portion 32b is formed at one end of an input shaft 32 positioned in a weighing machine housing 30a of the weighing machine 30 with respect to the joint portion 23e formed at one end of the output shaft 23. When the joint portion 23e and the joint portion 32b are engaged, the electric motor 10 and the weighing machine 30 are power-coupled.

[Output Cover]

A bearing 50 is interposed between the output cover 31 and the output shaft 23 at an intermediate position in the axial direction, and the output shaft 23 is rotatably supported by the output cover 31. The outer peripheral portion of the output shaft 23 is sealed by a seal 51 juxtaposed outside the bearing 50.

A plurality of (two in the embodiment) extending portions 31d protruding in the radially outer peripheral direction is provided on an end face of the output cover 31 toward the motor reducer 20, and screw holes 31e for mounting the fastening members 17 are provided in the respective extending portions 31d.

On an attachment face 31f of the output cover 31, a ring-shaped positioning projection 31g protruding from the attachment face 31f around the rotation axis of the output shaft 23 is formed. The output cover 31 couples the positioning projection 31g and the attachment face 31f to the end of the reducer casing 21 by using shrinkage fit, expansion fit, or the like on the inner peripheral portion of an output-side end face 21c of the reducer casing 21. As a result, the axial center of the output shaft 23 can be positioned on the same axial center as the axial center of the internal gear 21a.

Figure 2:
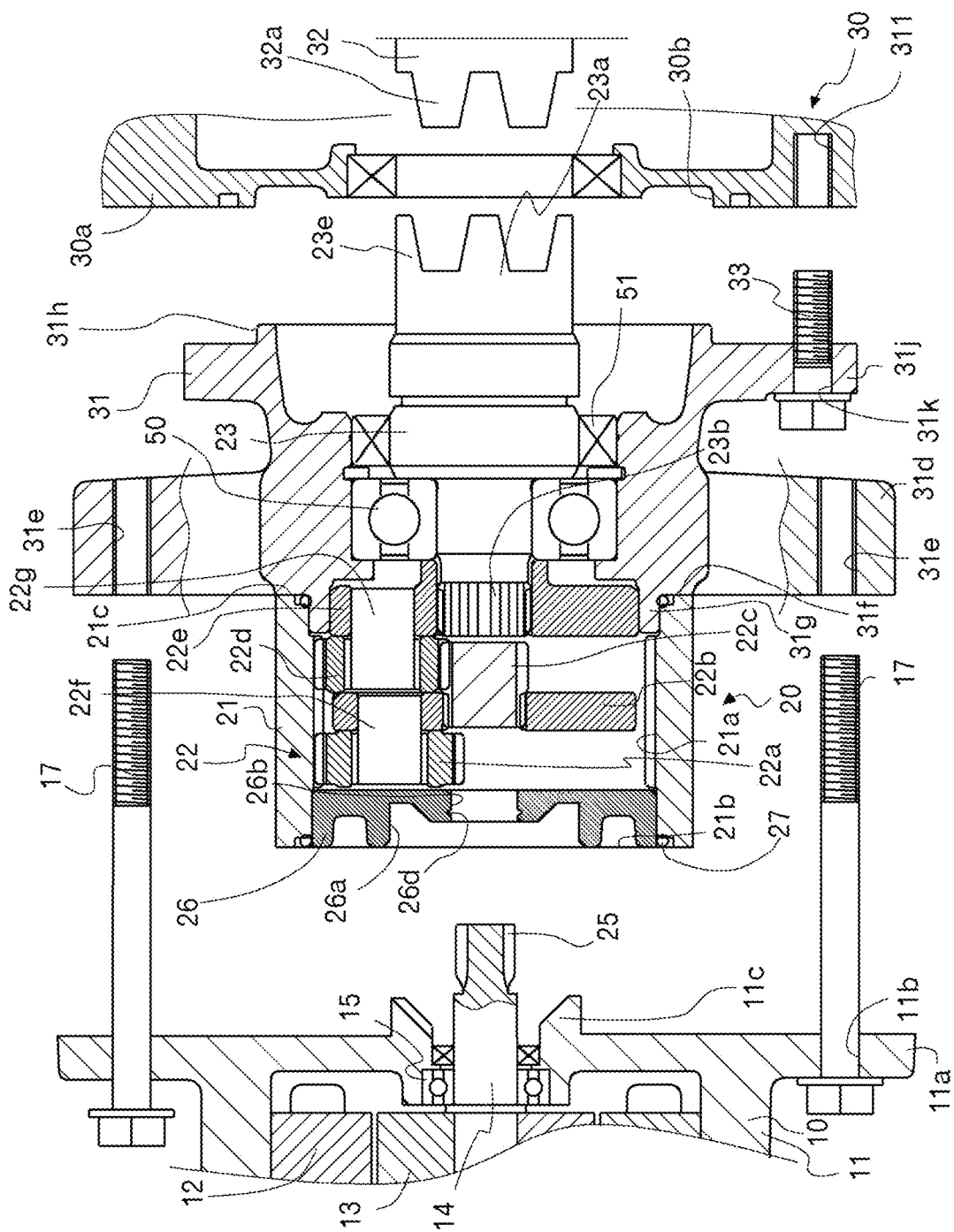
FIG. 2 is a partial cross-sectional view illustrating a motor reducer before assembly according to the first embodiment.
Figure 3:
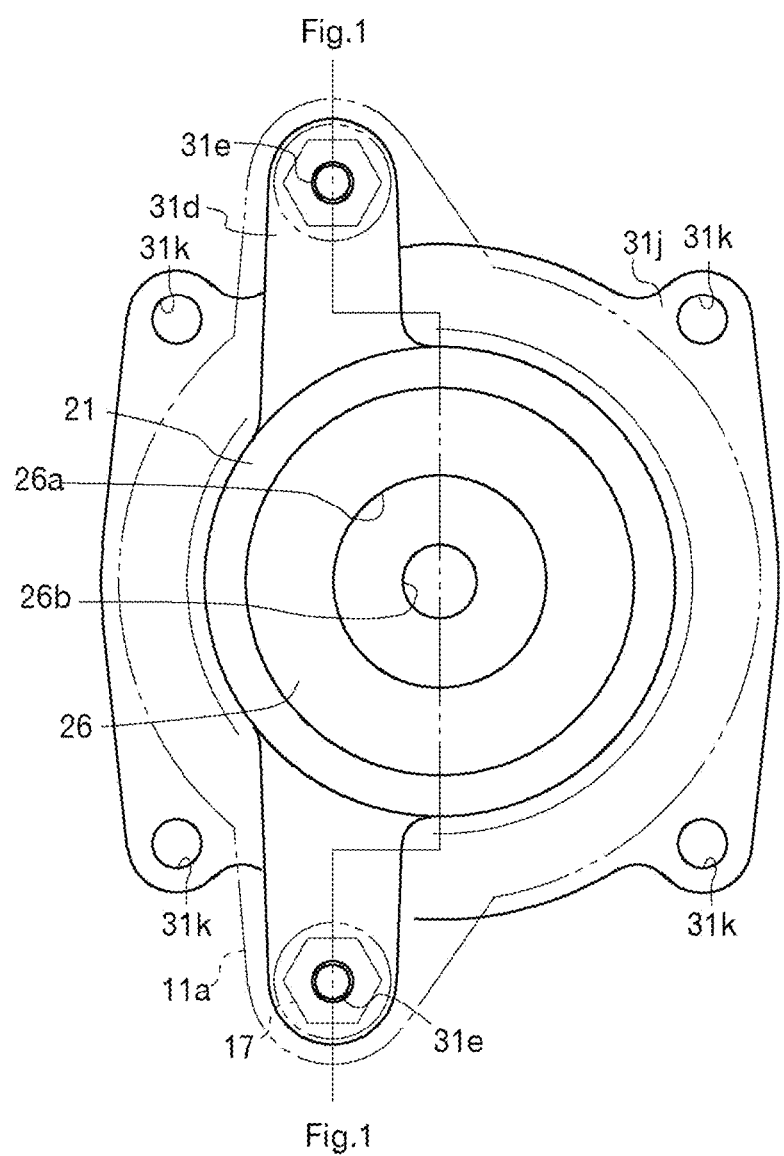
FIG. 3 is a front view illustrating the motor reducer according to the first embodiment.
Figure 4:
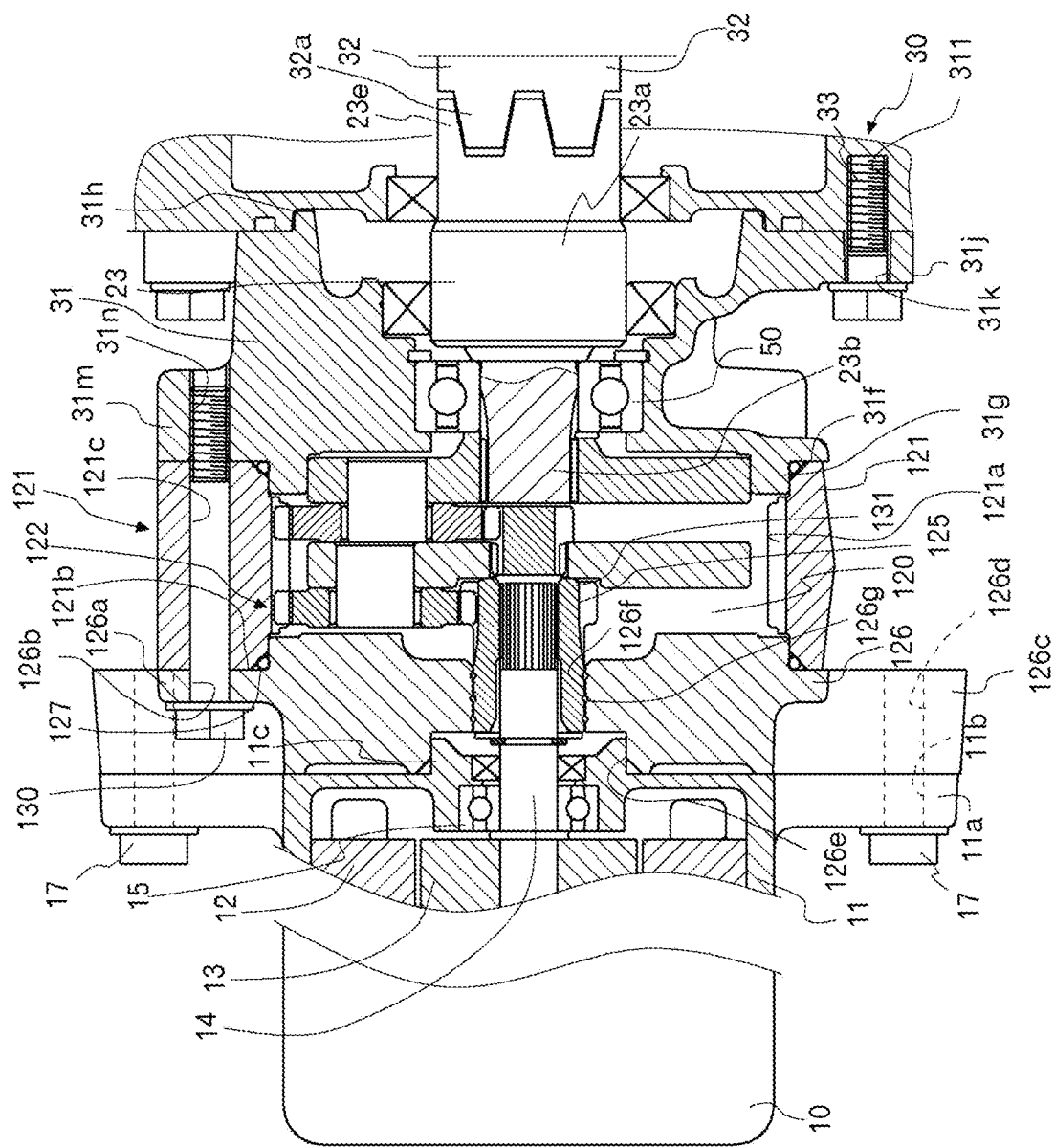
FIG. 4 is a partial cross-sectional view illustrating a motor reducer according to the second embodiment.
Figure 5:
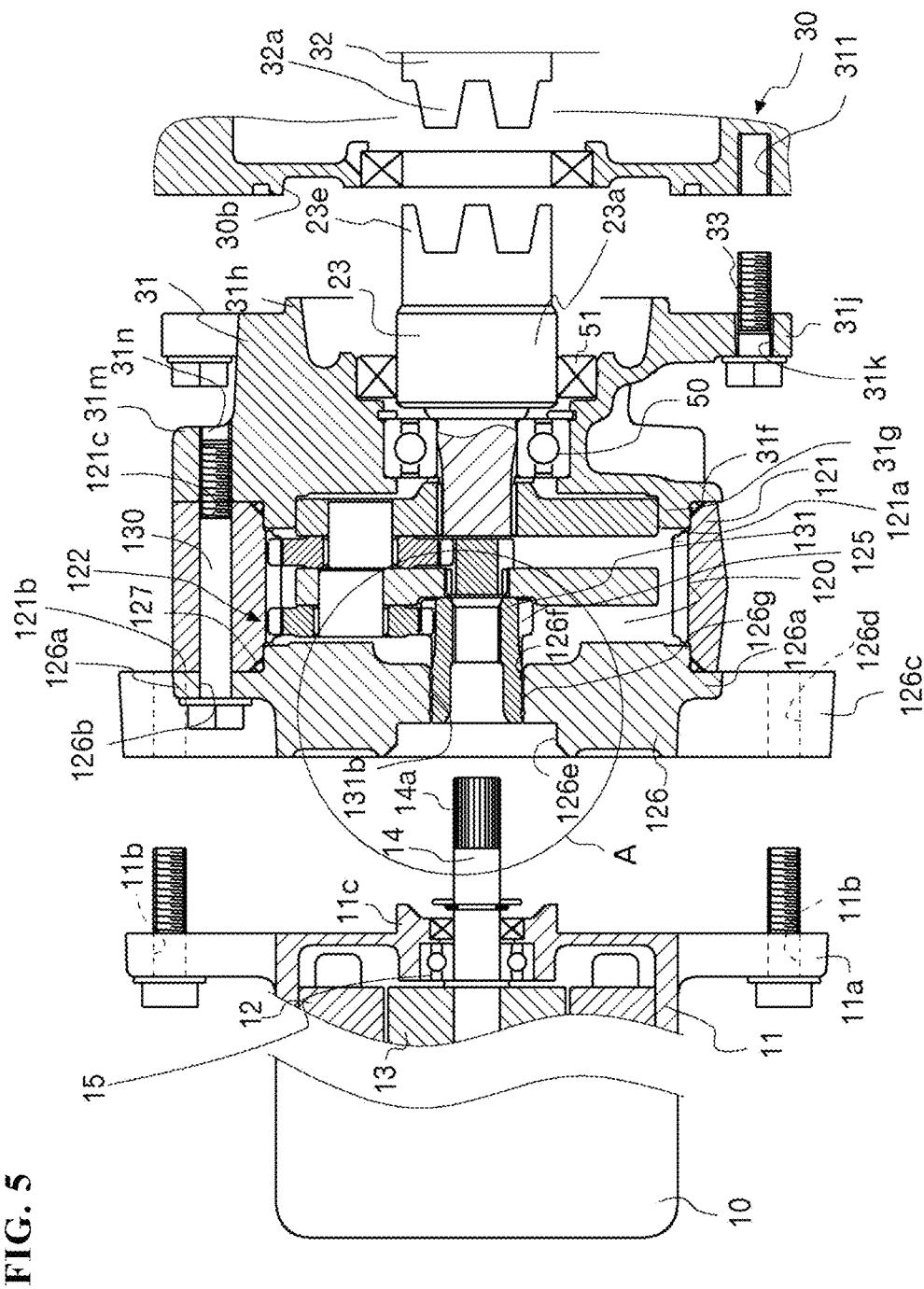
FIG. 5 is a partial cross-sectional view illustrating the motor reducer before assembly according to the second embodiment.

As shown in FIG. 2, the motor reducer 20 is sub-assembled by the reducer casing 21 (including an input cover 26, a reduction gear train 22, and an output shaft 23) coupled to the attachment face 31f of an output cover 31. When the electric motor 10 is coupled, the fastening member 17 is inserted into the penetration hole 11b of the extending portion 11a and screwed into a screw hole 31e of the output cover 31. As a result, the output cover 31 is fastened to the electric motor 10 with the motor reducer 20 interposed therebetween.

The second planetary carrier 22e of the reduction gear train 22 is formed in a disk shape, and an outer diameter thereof matches an inner diameter of the positioning projection 31g of the output cover 31. The outer peripheral face of the second planetary carrier 22e is rotationally slidably brought into direct contact with the inner peripheral face of the positioning projection 31g. As a result, the output shaft 23 spline-engaged with the second planetary carrier 22e is bearing supported by the output cover 31 via the second planetary carrier 22e as well as the bearing 50, and is stably supported at two points. A film made of an abrasion-resistant material may be formed on at least one of the inner peripheral face of the positioning projection 31g and the outer peripheral face of the second planetary carrier 22e in sliding contact with each other.

A ring-shaped positioning projection 31h centered on the rotation axis of the output shaft 23 is formed on an end face, of the output cover 31, facing the weighing machine 30. A ring-shaped positioning recess 30b centered on the rotation axis of the input shaft 32 is provided on an end face, of the weighing machine housing 30a, facing the motor reducer 20. The output cover 31 is attached to the weighing machine 30 in a state where the input shaft 32 and the output shaft 23 are aligned with each other by fitting the positioning projection 31h into the positioning recess 30b of the weighing machine housing 30a, and the joint portions 23e and 32b are coupled to each other.

A plurality of extending portions 31j protruding toward the radially outer periphery is provided on an end face, of the output cover 31, facing the weighing machine 30, and a penetration hole 31k is provided there. A fastening member 33 such as a bolt penetrates into the penetration hole 31k and screwed into a screw hole 31l of the weighing machine housing 30a, whereby the motor reducer 20 is coupled and fixed to the weighing machine 30.

Second Embodiment

Next, a motor reducer 120 according to the second embodiment will be described. In the description of the second embodiment, the same members as those of the first embodiment are denoted by the same reference numerals, and the description thereof will be omitted.

[Input Cover]

An input cover 126 of the second embodiment provided on a motor-side end face 121b of a reducer casing 121 is provided to encase components and grease inside the reducer casing 121. Each of a plurality of first extending portions 126a protruding to the radially outer peripheral side of the input cover 126 has a penetration hole 126b. The first extending portion 126a and the electric motor 10 side end face of the reducer casing 121 are brought into contact with each other, a fastening member 130 penetrates into the penetration hole 126b and a penetration hole 121c provided in the reducer casing 121, and is fastened to a screw hole 31n of an extending portion 31m provided in the output cover 31 to be fixed to the output cover 31 with the reducer casing 121 interposed therebetween.

The input cover 126 is provided with a plurality of second extending portions 126c, and each of the second extending portions has a screw hole 126d into which the fastening member 17 penetrates.

The electric motor 10 is fixedly supported by the input cover 126 by inserting the fastening member 17 into the penetration hole 11b of the motor casing 11 and screwing the fastening member into the screw hole 126d of the input cover 126.

A gap between the input cover 126 and the reducer casing 121 is sealed by a seal 127. A ring-shaped positioning recess 126e about the rotation axis of an internal gear 121a is provided on a face of the input cover 126 toward the electric motor 10 at the time of engagement with the motor casing 11. The ring-shaped positioning projection 11c about the rotation axis of the motor shaft 14 is provided on a face of the motor casing 11 toward the motor reducer 20. Accordingly, when the electric motor 10 is coupled to the motor reducer 20, the positioning projection 11c and the positioning recess 126e contact each other, whereby the motor shaft 14 is aligned with the internal gear 121a. In addition, since the input cover 126 and the motor casing 11 are provided separately as described above, even when the electric motor 10 is replaced, the motor reducer 120 is sealed by the input cover 126, and thus, the assembled state of the reduction gear train 122 is maintained without each component jumping out.

A central portion of the input cover 126 has a penetration hole 126f into which the motor shaft 14 penetrates. A plurality of annular grooves 126g is provided on the inner peripheral face of the penetration hole 126f along the axial direction.

The motor shaft 14 protrudes outward of the motor casing 11, and is rotatably supported by the bearing 15 interposed between the motor casing 11 and the motor shaft. In addition, a cylindrical body 131 is locked on a spline fitting portion 14a provided at the distal end of the motor shaft 14 so as to rotate integrally. A motor output gear 125 is integrally formed at an end of the cylindrical body 131 toward the reduction gear train 122.

A plurality of annular grooves 131b having a labyrinth structure is provided along the axial direction on an outer peripheral face of the cylindrical body 131 toward the electric motor 10.

Figure 6:
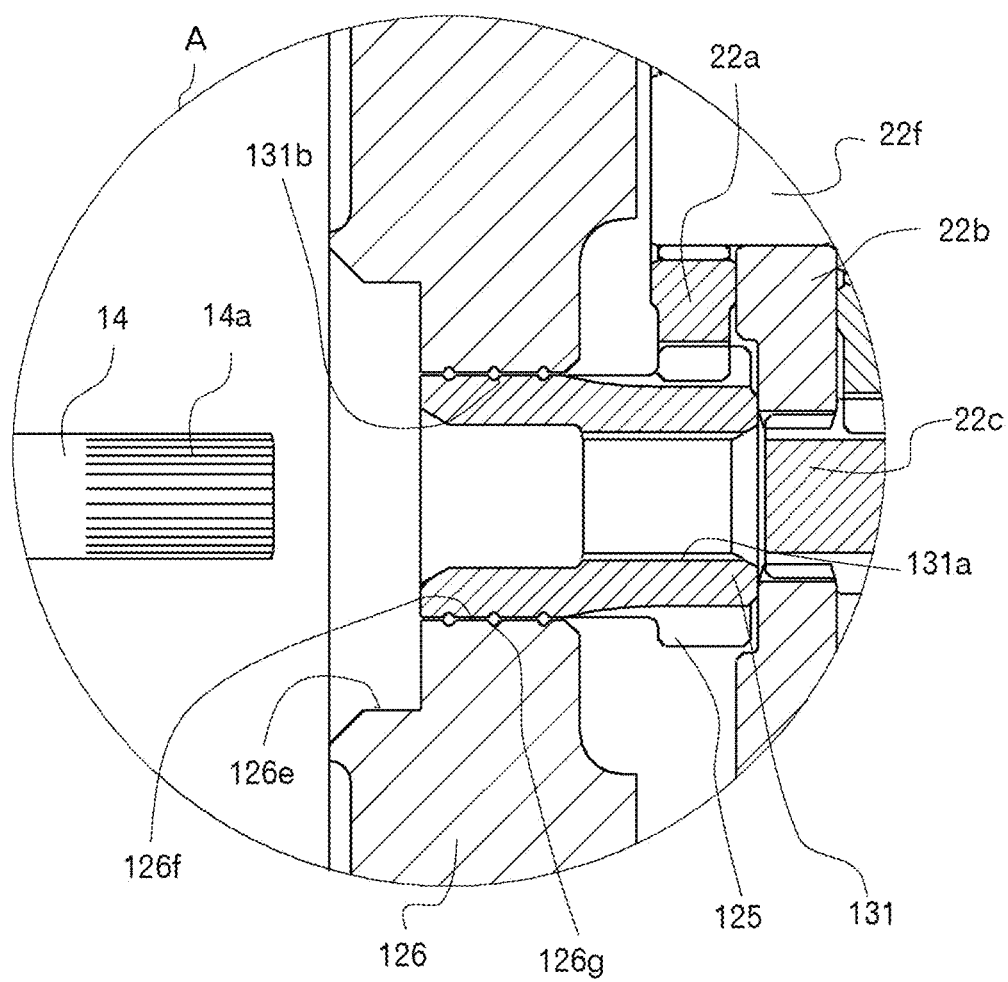
FIG. 6 is a partially enlarged view of A of FIG. 5 according to the second embodiment.

As illustrated in FIG. 6, when the cylindrical body 131 is positioned in the penetration hole 126f, the labyrinth structure is established by a groove 131b of the cylindrical body 131 and a groove 126g of the penetration hole 126f. When the motor shaft 14 rotates, a sealing effect is exerted by the action of the grooves 131b and 126g, and leakage of lubricating oil such as grease toward the electric motor 10 can be reduced.

In the present embodiment, the grooves are provided in both the outer peripheral face of the cylindrical body 131 and the penetration hole 126f, but the at least an embodiment of the present invention is not limited thereto, and the grooves may be formed in either one of the outer peripheral face and the penetration hole.

Figure 7:
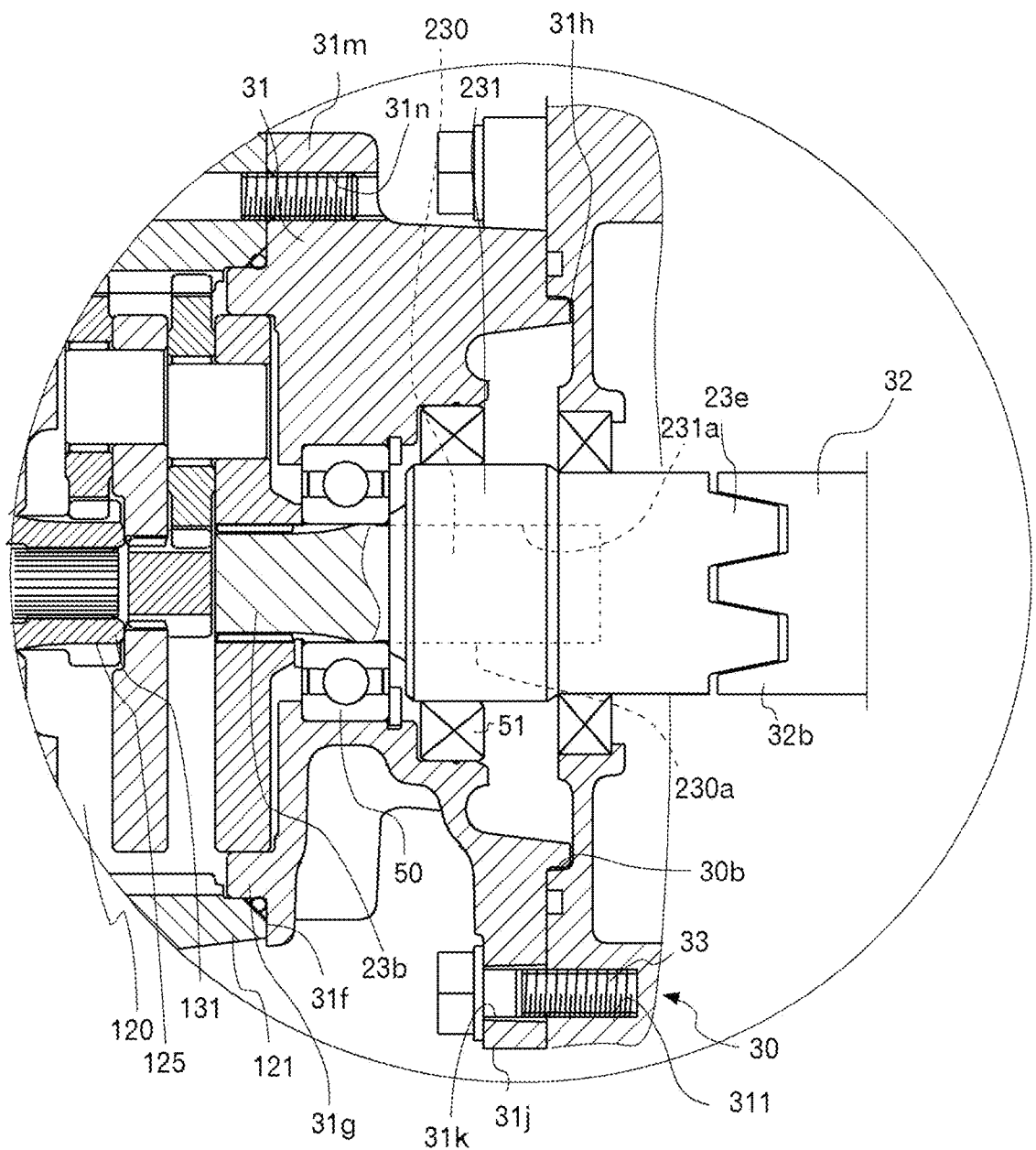
FIG. 7 is a partially enlarged view according to a modification of the first embodiment.

In addition, as illustrated in FIG. 7, the output shaft 23 may be configured by intercoupling a first output shaft portion 230 and a second output shaft portion 231. A substantially central portion of the first output shaft portion 230 in the axial direction is rotatably supported by the bearing 50 of the output cover 31, and the planetary carrier is locked to the other end 23b. The second output shaft portion 231 has a diameter larger than that of the first output shaft portion 230, and the joint portion 23e is integrally formed at one end portion thereof, and the other end portion extends to a position covered by the seal 51 to form a recess 231a on an end face thereof. One end 230a of the first output shaft portion 230 is relatively non-rotatably coupled to the recess 231a by spline (not illustrated).

As described above, in the motor reducer 20 that decelerates the rotation input from the electric motor 10 stored in the motor casing 11 according to the present embodiment, the motor reducer 20 includes the reduction gear train 22 that decelerates the rotation input from the electric motor 10 and the reducer casing 21 that accommodates the reduction gear train 22, the input cover 26 that seals the motor-side end face 21b of the reducer casing 21 is provided, and the input cover 26 is provided separately from the motor casing 11.

With such a configuration, since the motor-side end face 21b of the reducer casing 21 is sealed by the input cover 26, even in a state where the electric motor 10 is away from the input cover 26, each component in the reducer casing 21 does not jump out from the motor-side end face 21b, and the assembled state of the reduction gear train 22 is maintained.

The input cover 26 is fixed to one end of the reducer casing 21 constituting the reduction gear train 22.

With such a configuration, the input cover 26 can be prevented from separating from the reducer casing 21, and the reducer casing 21 can be reliably sealed.

In addition, the motor output gear 25 provided at one end of the motor shaft 14 of the electric motor 10 is integrally formed in the cylindrical body 131 fitted to the outer periphery of the motor shaft 14, the input cover 126 has the penetration hole 126b into which the motor shaft 14 and the cylindrical body 131 penetrate, and the groove 126g and the groove 131b are provided as a labyrinth groove between the inner peripheral face of the penetration hole 126b and the outer peripheral face of the cylindrical body 131.

With such a configuration, labyrinth structure exhibits a sealing effect when the motor shaft 14 rotates, and it is possible to reduce leakage of lubricating oil such as grease toward the electric motor 10 through the penetration hole 126b.

In addition, the motor output gear 25 having a tooth tip having an outer diameter substantially equal to or smaller than the diameter of the motor shaft 14 is provided at one end of the motor shaft 14 of the electric motor 10, and the input cover 26 has the penetration hole 26b into which the motor shaft 14 penetrates, and the groove 26d is provided between an inner peripheral face of the penetration hole 26b and an outer peripheral face of the motor shaft.

With such a configuration, when the motor shaft 14 rotates, the labyrinth structure makes it possible to suppress leakage of lubricating oil such as grease toward the electric motor 10 through the penetration hole 26b.

In addition, the output cover 31 to be coupled to the weighing machine 30 which is a load device is provided, and the output cover 31 rotatably supports an output shaft that outputs rotation from the reduction gear train 22 and seals the other end of the reducer casing 21.

With this configuration, it is possible to prevent dust from entering a space between the motor reducer 20 and the weighing machine 30.

The output cover 31 is fixed to the motor casing 11 by the fastening member 17.

With such a configuration, it is not necessary to provide a bulging portion into which the fastening member 17 penetrates in the reducer casing 21, and the cost for manufacturing the reducer casing 21 can be reduced.

Further, the reduction gear train 22 is of a planetary gear type, and an outer peripheral portion of a second planetary carrier 22e, which is a planetary carrier provided at one end of the output shaft 23, is rotatably slidably brought into contact with an inner face of the output cover 31.

With such a configuration, since the second planetary carrier 22e can be substituted as a bearing member of the output shaft 23, the number of bearings to be used can be reduced. In addition, the axial length of the output cover 31 can be shortened, and the size of the member can be reduced.

The above description relates to specific examples according to the present invention, and various modifications are possible without departing from the spirit of the present invention. The appended claims are intended to cover such applications within the true scope and spirit of the invention.

Therefore, all the examples disclosed in the present application should be considered as illustrative and not restrictive. The scope of the present invention is indicated in the following claims rather than in the above specification, and any modification that falls within the scope equivalent to the meaning of the claims should be included in the scope of the present invention.

What is claimed is:

1. A motor reducer that decelerates rotation input from an electric motor stored in a motor casing to output the rotation to a load device, the motor reducer comprising:
    a reduction gear train that decelerates rotation input from the electric motor;
    a reducer casing that accommodates the reduction gear train; and
    an input cover that seals a motor-side end face of the reducer casing, the input cover being provided separately from the motor casing and an outer surface of the input cover being interposed between inner surfaces of the reducer casing to face each other in a direction perpendicular to an axial direction,
    wherein the input cover is fixed so as to be separable at one end of the reducer casing constituting the reduction gear train and not to be movable in the axial direction, and
    wherein the input cover is attached to one end face of the reducer casing by a fastening member.

2. The motor reducer according to claim 1, wherein the input cover is fitted in a recess formed at the one end of the reducer casing.

3. The motor reducer according to claim 1, further comprising an output cover that is to be coupled to the load device, wherein the output cover rotatably supports an output shaft that outputs rotation from the reduction gear train and seals another end of the reducer casing.

4. The motor reducer according to claim 3, wherein the output cover is attached to another end face of the reducer casing by the fastening member.

5. The motor reducer according to claim 3, wherein the reduction gear train is of a planetary gear type, and an outer peripheral portion of a planetary carrier provided at one end of the output shaft is rotatably slidably brought into contact with an inner face of the output cover.

6. A motor reducer that decelerates rotation input from an electric motor stored in a motor casing to output the rotation to a load device, the motor reducer comprising:
    a reduction gear train that decelerates rotation input from the electric motor;
    a reducer casing that accommodates the reduction gear train; and
    an input cover that seals a motor-side end face of the reducer casing, the input cover being provided separately from the motor casing and an outer surface of the input cover being interposed between inner surfaces of the reducer casing to face each other in a direction perpendicular to an axial direction,
    wherein the input cover is fixed so as to be separable at one end of the reducer casing constituting the reduction gear train and not to be movable in the axial direction, wherein
    a motor output gear that rotates integrally with a motor shaft of the electric motor is integrally formed in a cylindrical body locked to an outer periphery of the motor shaft in a non-rotatable manner,
    the input cover has a penetration hole into which the cylindrical body penetrates, and
    a labyrinth groove is provided between an inner peripheral face of the penetration hole and an outer peripheral face of the cylindrical body.

7. A motor reducer that decelerates rotation input from an electric motor stored in a motor casing to output the rotation to a load device, the motor reducer comprising:
    a reduction gear train that decelerates rotation input from the electric motor;
    a reducer casing that accommodates the reduction gear train; and
    an input cover that seals a motor-side end face of the reducer casing, the input cover being provided separately from the motor casing and an outer surface of the input cover being interposed between inner surfaces of the reducer casing to face each other in a direction perpendicular to an axial direction,
    wherein the input cover is fixed so as to be separable at one end of the reducer casing constituting the reduction gear train and not to be movable in the axial direction, wherein
    a motor output gear having a tooth tip having an outer diameter equal to or smaller than a diameter of a motor shaft at one end of the motor shaft of the electric motor is provided,
    the input cover has a penetration hole into which the motor shaft penetrates, and
    a labyrinth groove is provided between an inner peripheral face of the penetration hole and an outer peripheral face of the motor shaft.

* * * * *